(12) United States Patent
Hoeppner

(10) Patent No.: US 11,862,951 B2
(45) Date of Patent: Jan. 2, 2024

(54) CABLE CHANNEL

(71) Applicant: DEERE & COMPANY, Moline, IL (US)

(72) Inventor: Ulf Hoeppner, Bammenthal (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/813,729

(22) Filed: Jul. 20, 2022

(65) Prior Publication Data

US 2023/0094816 A1 Mar. 30, 2023

(30) Foreign Application Priority Data

Sep. 24, 2021 (DE) .......................... 102021124737.3

(51) Int. Cl.
| | |
|---|---|
| *H02G 3/06* | (2006.01) |
| *B60R 16/02* | (2006.01) |
| *H02G 3/04* | (2006.01) |
| *H02G 5/02* | (2006.01) |

(52) U.S. Cl.
CPC ....... *H02G 3/0608* (2013.01); *B60R 16/0215* (2013.01); *H02G 3/045* (2013.01); *H02G 5/025* (2013.01)

(58) Field of Classification Search
CPC .............. H02G 3/32; H02G 3/04; H02G 3/06
See application file for complete search history.

(56) References Cited

U.S. PATENT DOCUMENTS

| | | | | |
|---|---|---|---|---|
| 1,986,965 | A * | 1/1935 | Harrison .............. | H02G 3/0608 191/23 R |
| 3,022,972 | A * | 2/1962 | Bunston ............... | H02G 3/0456 248/68.1 |
| 3,633,628 | A * | 1/1972 | Duquette ............. | H02G 3/0608 138/116 |
| 4,035,051 | A * | 7/1977 | Guy ...................... | H01R 13/516 439/468 |
| 4,864,082 | A * | 9/1989 | Ono ...................... | H02G 3/0437 174/101 |
| 5,024,251 | A * | 6/1991 | Chapman ............... | H01R 4/304 16/361 |
| 5,399,812 | A * | 3/1995 | Woszczyna ......... | B60R 16/0215 174/99 R |
| 5,534,665 | A * | 7/1996 | Long ................... | B60R 16/0215 174/72 A |
| 5,887,831 | A * | 3/1999 | Post ......................... | H02G 3/26 248/237 |

(Continued)

FOREIGN PATENT DOCUMENTS

| | | |
|---|---|---|
| EP | 1675231 B1 | 5/2012 |
| EP | 2725670 B1 | 6/2014 |

(Continued)

OTHER PUBLICATIONS

European Search Report in application No. EP22191465.8, dated Feb. 1, 2023, 10 pages.

*Primary Examiner* — Krystal Robinson

(57) ABSTRACT

A cable channel for receiving at least one cable includes a first cable housing and a second cable housing. The first cable housing includes a first connector and the second cable housing includes a first mating connector releasably connected to the first connector arranging the first and second cable housings together.

20 Claims, 5 Drawing Sheets

(56) References Cited

U.S. PATENT DOCUMENTS

| | | | | |
|---|---|---|---|---|
| 6,216,746 | B1* | 4/2001 | Guebre-Tsadik | H02G 3/0608 |
| | | | | 138/158 |
| 6,383,014 | B1* | 5/2002 | Saito | B60R 16/0215 |
| | | | | 439/456 |
| 6,428,364 | B2* | 8/2002 | Saito | H01M 50/522 |
| | | | | 439/942 |
| 7,226,022 | B2* | 6/2007 | Bernard | H02G 3/0608 |
| | | | | 403/387 |
| 7,964,804 | B2* | 6/2011 | Kaplan | H02G 3/0431 |
| | | | | 174/101 |
| 8,242,367 | B2* | 8/2012 | Guthke | H02G 3/0456 |
| | | | | 174/72 A |
| 8,960,611 | B1* | 2/2015 | Wurzer | H02G 9/025 |
| | | | | 248/65 |
| 9,029,700 | B2* | 5/2015 | Hara | B60R 16/0215 |
| | | | | 174/72 A |
| 9,150,115 | B2* | 10/2015 | Ikeda | H02G 3/0437 |
| 9,214,752 | B2* | 12/2015 | Liu | H01M 50/507 |
| 10,821,918 | B2* | 11/2020 | Uematsu | B60R 16/0215 |
| 2009/0314541 | A1 | 12/2009 | Jones et al. | |
| 2016/0248235 | A1 | 8/2016 | Itou | |
| 2020/0251250 | A1 | 8/2020 | Lyfar | |
| 2020/0277739 | A1* | 9/2020 | Brooker | H02G 3/0418 |
| 2022/0105883 | A1 | 4/2022 | Schmadeke | |

FOREIGN PATENT DOCUMENTS

| WO | WO2012011982 | A2 | 1/2012 |
|---|---|---|---|
| WO | WO2020076860 | A1 | 4/2020 |

\* cited by examiner

CABLE CHANNEL

CROSS-REFERENCE TO RELATED APPLICATIONS

This application claims priority to German Patent Application No. 102021124737.3, filed on Sep. 24, 2021, which is hereby incorporated by reference.

FIELD OF THE DISCLOSURE

The disclosure relates to a cable channel for receiving at least one cable.

BACKGROUND

Vehicles include cables routed to various locations around the vehicle.

SUMMARY

In vehicle construction, cable channels are used, for example, to secure electrical lines or line bundles in a specified position and to protect them from possible damage in this specified position. In this case, the cable channel must be adapted to a specific configuration of the cable or cable set, which is relatively expensive.

The present disclosure is based on the object of providing a cable channel, which, in an economical manner, is suitable for receiving cables. This object is achieved by a cable channel having the features of one or more of the following embodiments.

According to an aspect of the present disclosure, the cable channel has a combination of a plurality of channel-like cable housings for the purpose of receiving at least one cable. In this case, the cable housing has at least one mating connector, which is releasably connected to a corresponding mating connector of a further cable housing. Two cable housings can thus be releasably arranged together.

Any number of cable housings can therefore be releasably connected to one another in a geometrically structured way. This enables a variable and therefore cost-effective adaptation of the cable channel to the specific configuration and the specific requirements (e.g., a predetermined progression along a vehicle) of the respective cable. The cable housings can be designed to be similar or identical in terms of essential geometrical and functional features, whereby, with a single type of cable housing, different cable channels can be produced in a cost-effective manner.

The above-mentioned single type of cable housing means for example that all the cable housings used are constructed identically, thereby facilitating economical manufacture of different cable channels.

Overall, the cable channel with its cable housings is constructed in a modular or sectional manner and can thus be adapted to different design requirements of the cable in a technically simple and cost-effective manner. The provision of different prefabricated cable channels corresponding to the different cable variants in terms of progression and configuration is therefore unnecessary.

The releasable connection between the connector and a corresponding mating connector is designed for example as a latching connection and/or a form-fitting connection.

The term "cable" is used here to represent a single cable or a plurality of cables. The latter can be configured as a common cable bundle or a cable set. The cable can represent one or more electrical lines. However, other lines, e.g., hydraulic and/or pneumatic lines, are also conceivable.

The cable channel can have different technical fields of use. It can be used in a vehicle. The vehicles are for example agricultural vehicles, forestry vehicles and construction machines.

Further advantageous configurations of the cable channel are revealed in the one or more embodiments disclosed herein.

The cable housing can have both at least one connector and the respective corresponding mating connector. The modular construction of the cable channel is thus facilitated.

The connector and the corresponding mating connector can be releasably connected to one another in such a way that two connected cable housings are arranged together in the channel longitudinal direction. The cable channel can therefore be individually elongated in the channel longitudinal direction or cable longitudinal direction and consequently adapted to the respective properties of the cable in a cost-effective manner.

For technically simple realization of the individual elongation of the cable channel in the channel longitudinal direction, the connector and the corresponding mating connector can be arranged on an end portion of the respective cable housing, which end portion is on the longitudinal channel side.

In an embodiment, the connector and/or the corresponding mating connector of the cable housing is releasably connected in each case to a terminating part. This terminating part can replace the optional attachment of a further cable housing. The terminating part supports flanking means for radially flanking a cable received by the cable housing. In this case, the flanking means extend at least in the channel longitudinal direction and/or in a circumferential direction extending transversely to the channel longitudinal direction. For example, the flanking means are flanking webs aligned in the channel longitudinal direction and/or a flanking ring surrounding the cable. For flanking the cable, the flanking means, irrespective or their geometrical configuration, can be arranged with a radial spacing or without a radial spacing from the outer sheath of the cable. The use of the terminating part with its flanking means enables the cable to be secured on a free end or end portion of the cable housing and thus ensures, in a technically simple manner, that a desired specified position of the cable is maintained.

In a further embodiment, at least one of the connectors present and the corresponding mating connector are designed and releasably connected to one another in such a way that two cable housings are arranged together transversely to the channel longitudinal direction. The modular, variable widening of the cable channel can therefore also be realized transversely to the channel longitudinal direction. As a result, if necessary, a multiplicity of cables can also be mounted in a structured manner adjacent to one another within a single cable channel. This in turn facilitates the handling of the cables during assembly, for example during installation in a vehicle.

The releasable connection can be maintained as a result of a spring force acting between the two cable housings transversely to the channel longitudinal direction. To this end, at least one spring element can be arranged on an outer side of the cable housing, which spring element acts with a spring force on the further cable housing transversely to the channel longitudinal direction.

For a technically simple releasable connection of two cable housings transversely to the channel longitudinal direction, the connector can be arranged on an outer side of the cable housing and designed as an arm extending approximately transversely to the channel longitudinal direction. This arm is then releasably connected to the corresponding mating connector, which is arranged on an outer side of the further cable housing. This releasable connection can be maintained as a result of the above-mentioned spring force. The releasable connection can be released by applying a counter force which is greater than the spring force.

The cable housing furthermore can have two mutually cooperating housing shells, which are releasably connected to one another and, in the connected state, delimit a channel-like cavity for the cable. The shell-like structure enables simple construction and assembly of the cable housing. Moreover, such a cable housing facilitates technically simple handling of the cable during its installation in the cable channel.

A first housing shell of the cable housing can act as a receiving shell for receiving the cable. The second housing shell then acts as a cover shell or cover for effective mechanical protection of the cable inserted into the first housing shell. For example, the housing shell acting as a cover has a planar outer side or outer surface. The entire cable channel can thus have a substantially planar outer side or outer surface, which, in technical terms, facilitates the handling of the cable channel in an installation area (e.g., in a vehicle).

In an embodiment, the cable housing, on an outer region along the channel longitudinal direction, supports a plurality of mutually spaced securing elements for releasably securing a line. As a result, the cable channel, in an additional function, also enables the structured positioning and installation of line- or cable-like objects outside its housing.

The line can be designed in different ways. For example, it can be designed in the manner of a band or strip with a plurality of flat lines, which serve for data transfer and/or signal transmission.

For example, the line is designed as an electrical bar (e.g., a busbar or grounding busbar). Owing to its stable and possibly rigid material properties, the bar secured to the cable channel in turn acts as a type of mechanically stabilizing backbone for maintaining the mechanical connection between the cable housings.

In order to facilitate stable mechanical securing of the line on the cable channel, two securing rows, which can extend equidistantly in the channel longitudinal direction and have in each case a plurality of mutually spaced securing elements, are provided on the cable channel.

The above and other features will become apparent from the following detailed description and accompanying drawings.

BRIEF DESCRIPTION OF THE DRAWINGS

The inventive cable channel is explained in more detail below with reference to the accompanying drawings. In this case, components which correspond to one another or are comparable in terms of their function are denoted by the same reference signs. In the drawings.

DETAILED DESCRIPTION

The embodiments or implementations disclosed in the above drawings and the following detailed description are not intended to be exhaustive or to limit the present disclosure to these embodiments or implementations.

Figure 1:
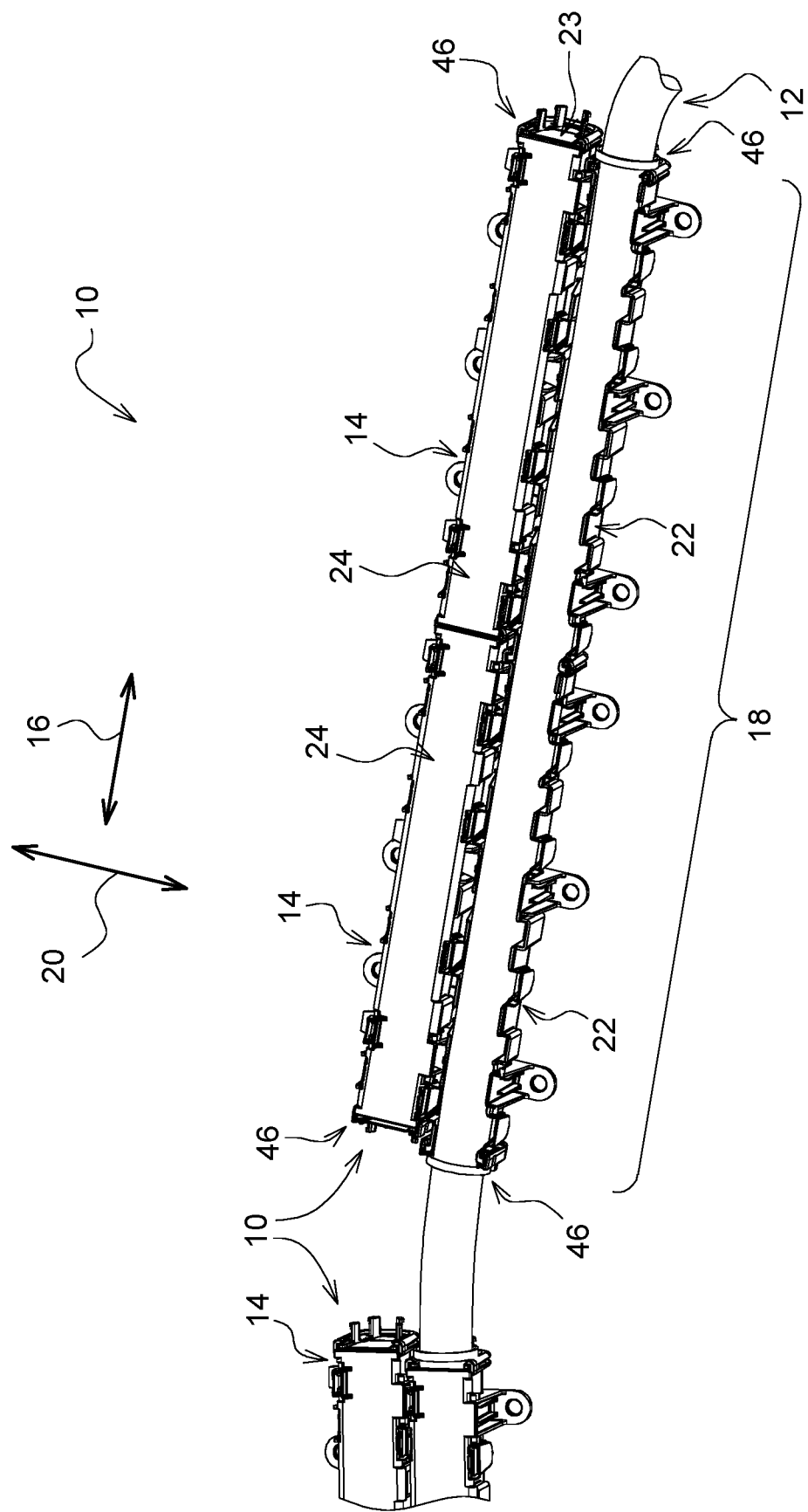
FIG. 1 shows a perspective illustration of sections of an inventive cable channel with open cable housings in the region of a received cable.

FIG. 1 shows a cable channel 10 for receiving a cable 12, which is designed for example as an electric cable having one or more electrical lines. The cable channel 10 has a combination of a plurality of (e.g., identically designed) cable housings 14, which receive the cable 12 along an axial cable longitudinal direction or channel longitudinal direction 16, at least in sections—here along a section 18. For combining and arranging a plurality of cable housings 14 together, a plurality of connectors and corresponding mating connectors are provided on the cable housings 14.

According to some embodiments, all the cable housings 14 are designed to be identical, at least functionally and in terms of their dimensions and geometrical measurements. The connectors and corresponding mating connectors are therefore present on each cable housing 14.

Figure 2:
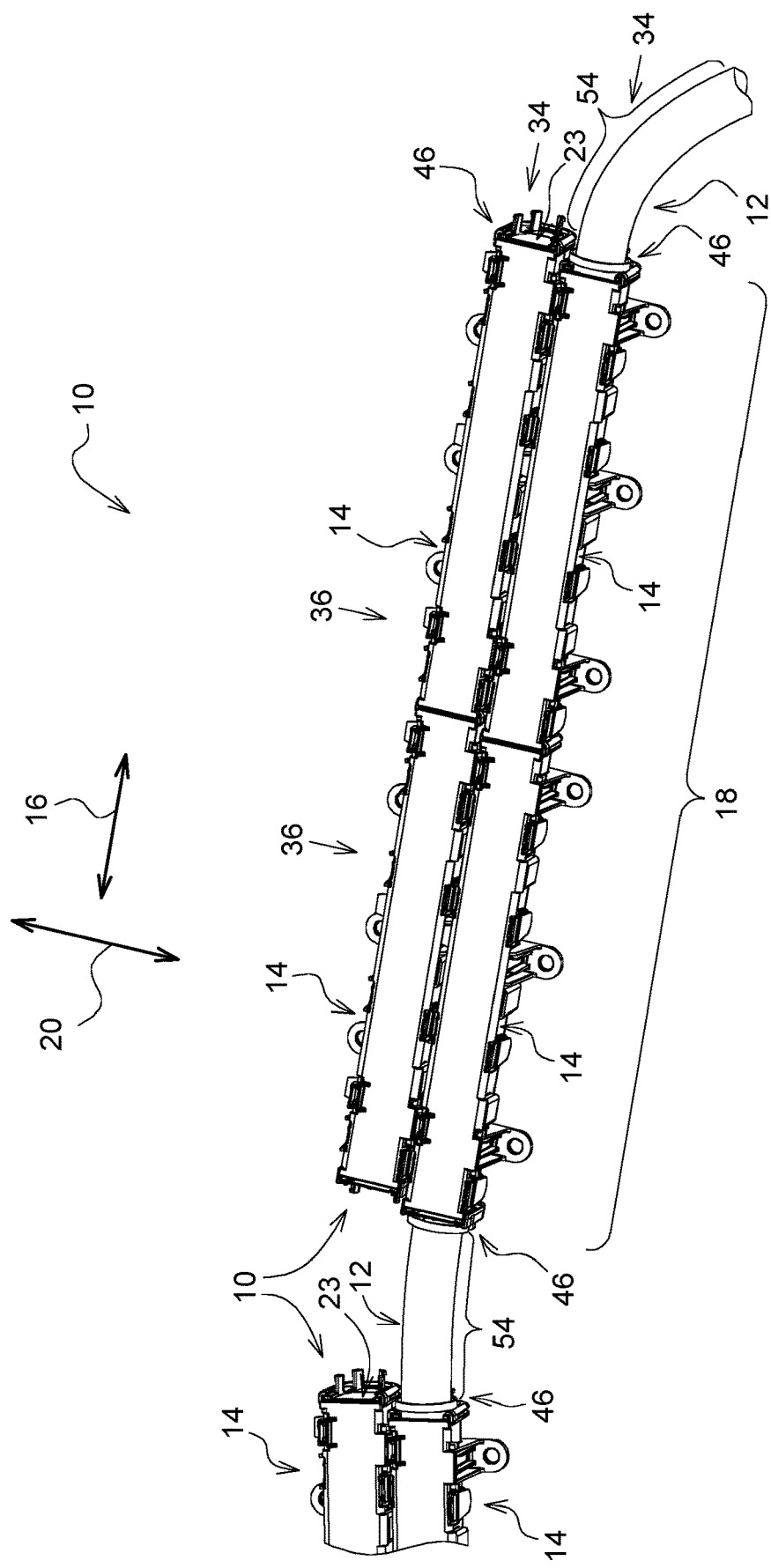
FIG. 2 shows the illustration of the cable channel according to FIG. 1 with closed cable housings in the region of the received cable.

The connectors and corresponding mating connectors yet to be described are designed in such a way that a multiplicity of cable housings 14 can be arranged together in the channel longitudinal direction 16 and/or in a transverse direction 20 transversely to the channel longitudinal direction 16 (FIG. 1, FIG. 2).

Figure 3:
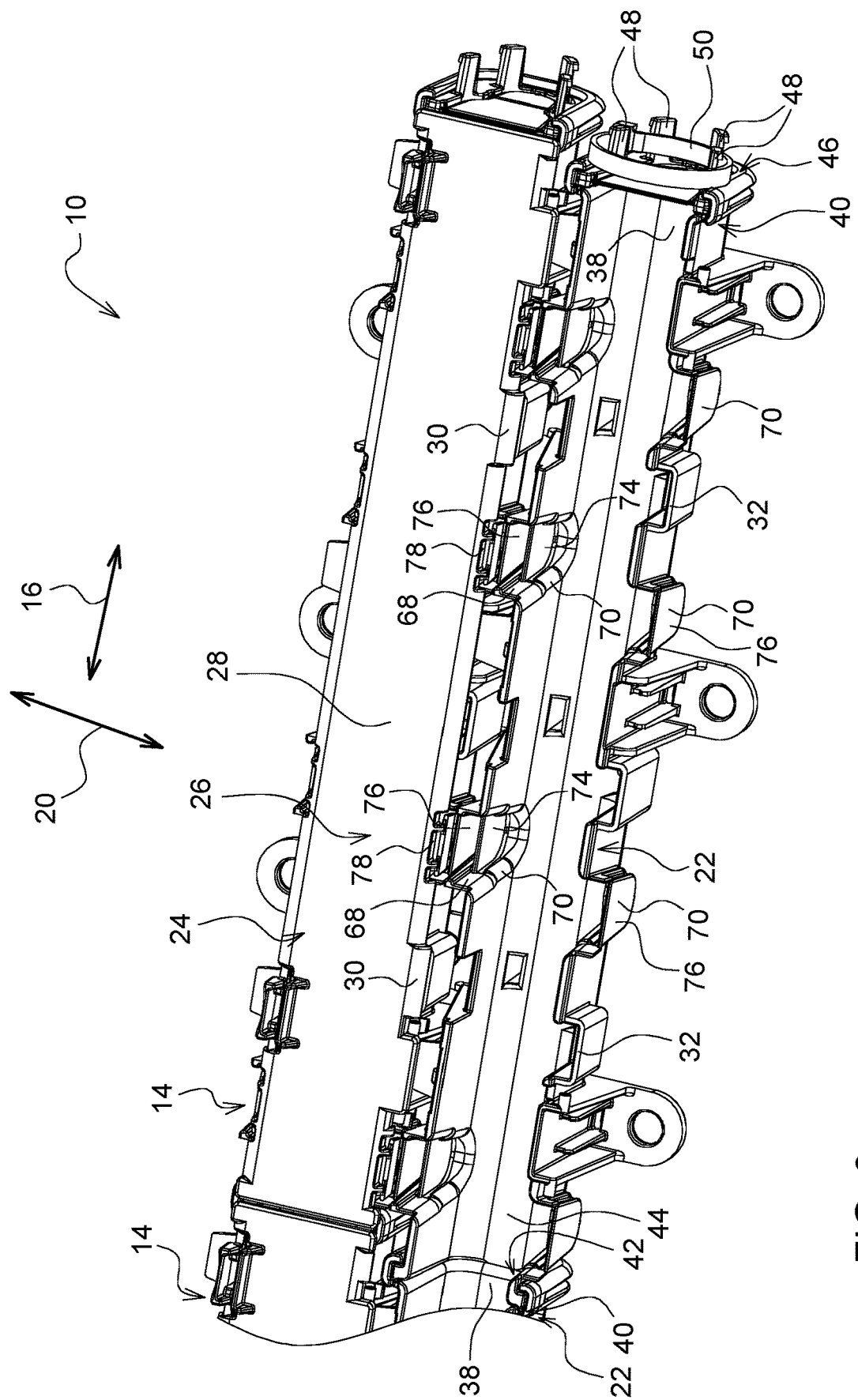
FIG. 3 shows a perspective partial illustration of the cable housing according to FIG. 1, but without a received cable.

It can be seen from a comparison between FIG. 1 and FIG. 3 that the cable housing 14 has two mutually cooperating housing shells 22, 24. A first housing shell of the cable housing 14 acts as a receiving shell 22 for receiving the cable 12. A second housing shell then acts as a cover shell 24 or a cover for effective mechanical protection of the cable 12 inserted into the receiving shell 22. The cover shell 24 has a planar outer surface 28 on its cover outer side 26. As a result, the entire cable channel 10 can have a substantially planar cover outer side 26 or outer surface, which facilitates its handling in terms of assembly, i.e., its installation in a vehicle.

After the respective portion of the cable 12 has been inserted into the receiving shell 22 (FIG. 1), the cover shell 24 is releasably connected to the receiving shell 22 in order to complete the cable housing 14 and to form a channel-like cavity 23 for the cable 12 (FIG. 2).

It can be seen in FIG. 3 that, for the connection of the two shells 22, 24, assembly lugs 30 of the cover shell 24 engage in assembly recesses 32 in the receiving shell 22. These assembly elements 30, 32 can be designed in such a way that they facilitate a releasable connection (e.g., a form- and/or force-fitting latching) of the two shells 22, 24.

Four cable housings 14 arranged together are visible in FIG. 1 and FIG. 2. In this case, two cable housings 14 are arranged together in the channel longitudinal direction 16 in each case, so that two parallel longitudinal rows 34 are formed. As seen in the transverse direction 20, two cable housings 14 are likewise arranged together in each case, so that two transverse rows 36 are formed. However, for assembly reasons, the cable housings 14 of the transverse row 36 are arranged regularly offset in the channel longitudinal direction 16.

It can be seen in FIG. 3 that the receiving shell 22 has, on its one end portion 38 on the channel longitudinal side, a connector 40 which is releasably connected to a corresponding mating connector 42 of a further end portion 44 of the adjacent receiving shell 22. The individual receiving shells 22 have in each case both the connector 40 and the corresponding mating connector 42. Any number of cable housings 14 can thus be arranged together in the channel longitudinal direction 16.

If a further cable housing 14 or further receiving shell 22 is not added at the respective end portion 38, 44 of the receiving shell 22, a releasable connection of the connector 40 and/or the corresponding mating connector 42 to a terminating part 46 is provided. The terminating part 46 supports flanking means in the form of a plurality of flanking webs 48 and possibly additionally a flanking ring 50.

The flanking webs 48 are arranged at a spacing from one another in a circumferential direction 52 extending transversely to the channel longitudinal direction 16 and extend substantially in the channel longitudinal direction 16. The flanking ring 50 extends in the circumferential direction 52 and is arranged partially inside and partially outside the flanking webs 48, as seen radially.

The above-mentioned flanking means 48, 50 flank the cable 12 outside the cable housing 14 near to the end portion 38 or end portion 44. Depending on the configuration, individual flanking means 48, 50 flank the cable 12 with or without a radial spacing. They help to ensure that the portion 18 of the cable 12 which is received by one or more cable housings 14 remains in the desired specified position and substantial relative movements between the portion 18 of the cable 12 and the receiving cable housing(s) are therefore not generated axially or in the channel longitudinal direction 16.

To this end, the flanking ring 50 is designed for example as a cable tie, which is tightly fastened until the cable 12 is pressed radially against individual flanking webs 48.

The terminating parts 46 moreover help to ensure that the cable 12, outside the received portions 18, retains free portions 54 which create flexible bending portions for flexible installation of the entire cable channel 10 in the installation area, e.g., in a vehicle.

Figure 4:
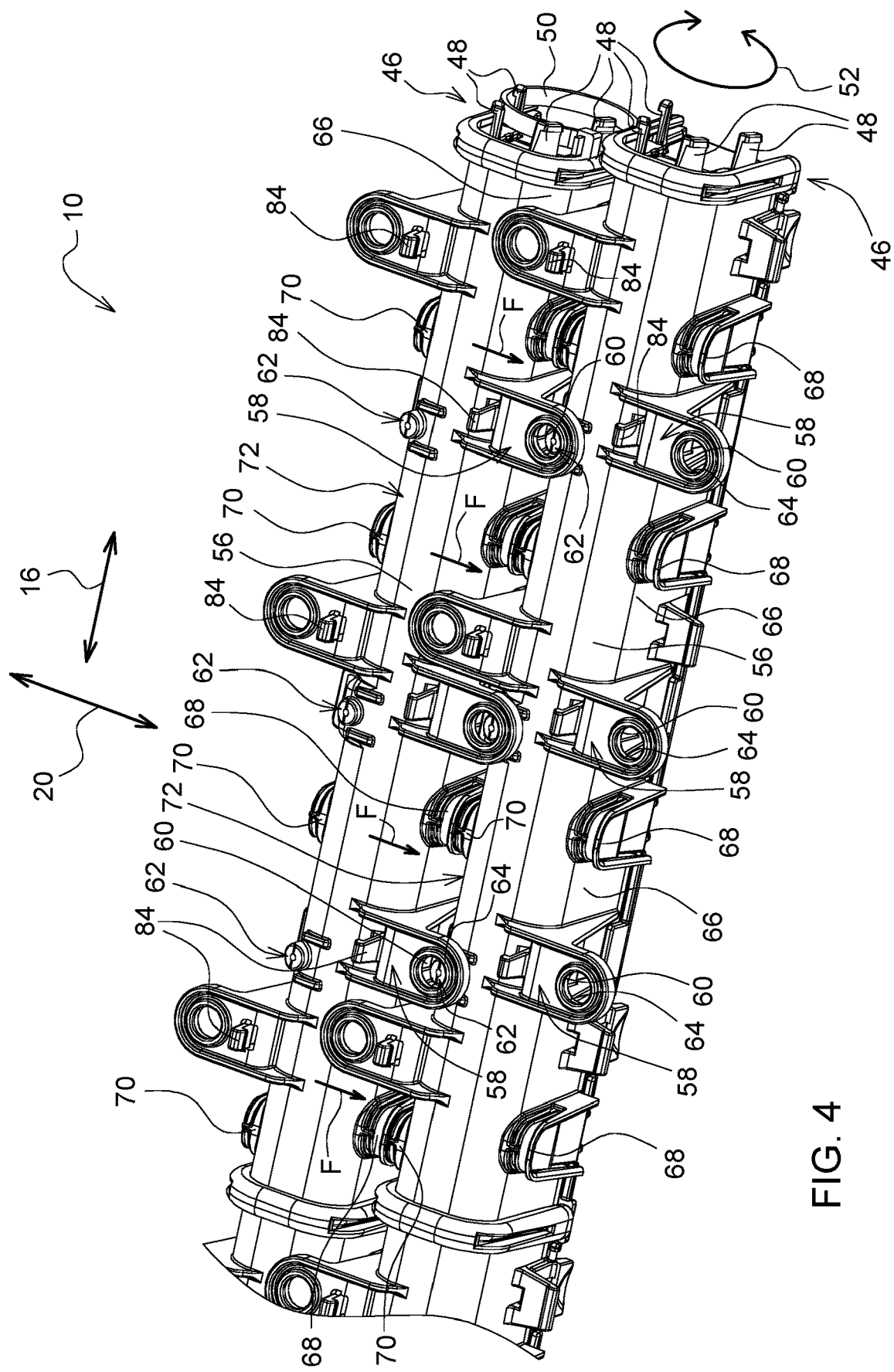
FIG. 4 shows a perspective illustration of the underside (not visible in FIG. 3) of the cable housing.

It can be seen in FIG. 4 that the receiving shell 22 has, at its outer side 56, a plurality of connectors in the form of flat connection arms 58, which extend substantially in the transverse direction 20. Each connection arm 58 incorporates a through-hole 60 and corresponds to a connection pin 62, which is arranged as a corresponding mating connector on the outer side 56 of the further receiving shell 22.

The connection arm 58 and the corresponding connection pin 62 form a technically easily releasable connection of two cable housings 14 in the transverse direction 20. A hole wall 64 of the through-hole 60 and the corresponding connection pin 62 abut against one another in the manner of a form-fitting connection, which is maintained as a result of a spring force F acting in the transverse direction 20. The spring force F is generated by a plurality of spring blocks 68 arranged on an outer flank 66 of the receiving shell 22. In the assembled state of the cable housings 14 arranged together in the transverse direction 20, the spring force F of the spring blocks 68 acts in each case on a counter-block 70. The counter-blocks 70 are arranged on a further outer flank 72 of the receiving shell 22. If the two cable housings 14 arranged together in the transverse direction 20 are pressed against one another in the transverse direction 20 by a counter-force which is greater than the spring force F of the spring blocks 68, the releasable connection 58, 62 can be broken.

As can be seen in FIG. 3, the spring blocks 68, and also the counter-blocks 70, are enclosed in the receiving shell 22 with break-away walls 74, 76, which can be removed manually to form a cable outlet or a protected cable access point extending between adjacent cable housings 14. Additionally, break-away portions 78 are provided in the cover shell 24, which break-away portions can likewise be removed to enlarge the associated cable outlet or cable passage in the region of the associated spring block 68 or counter-block 70.

Figure 5:
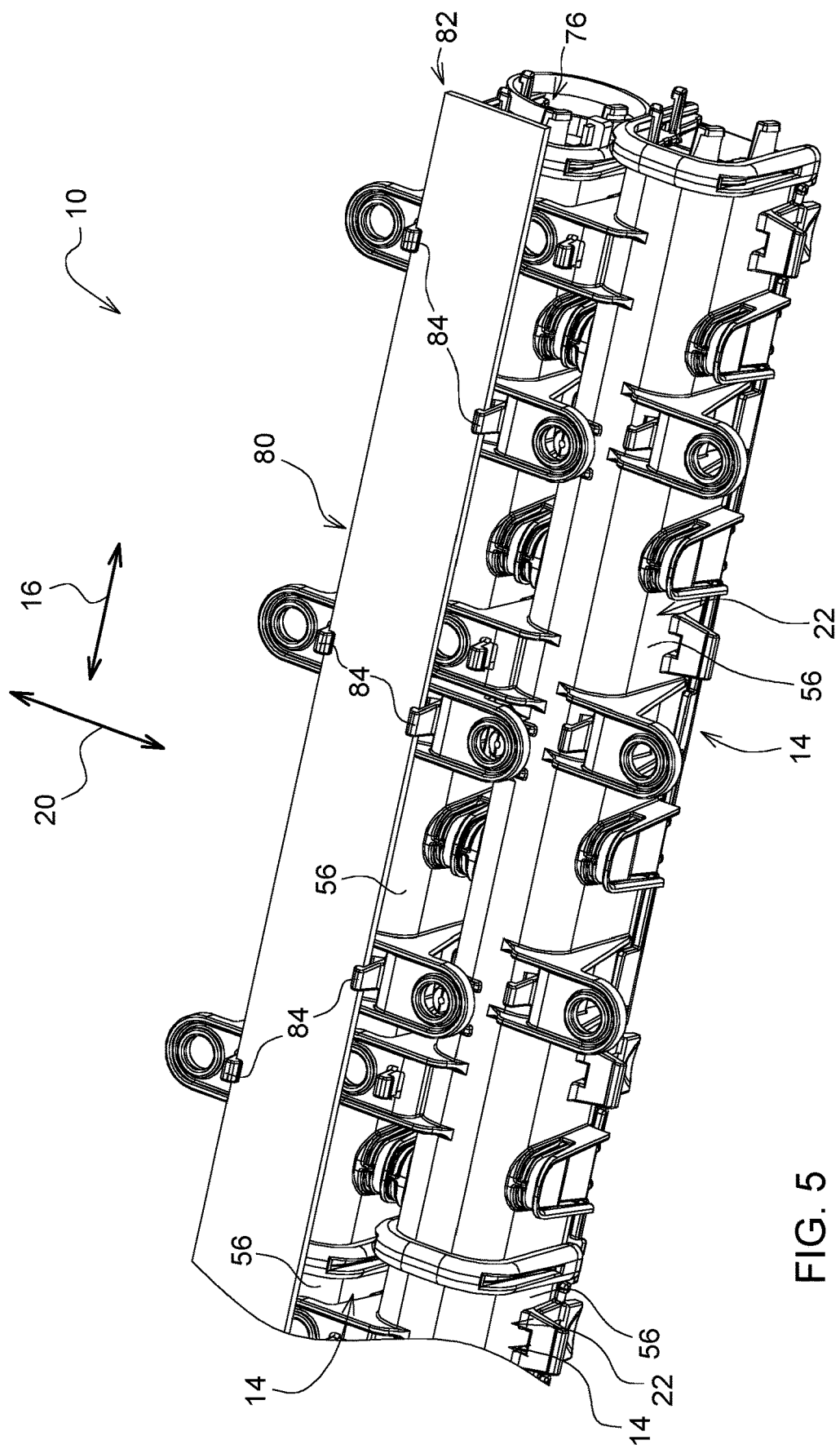
FIG. 5 shows the perspective illustration of the underside according to FIG. 4 and a line secured thereon.

FIG. 5 shows the underside (already shown in FIG. 4) of the cable channel 10 with the outer sides 56 of the receiving shells 22. A line 80 is releasably secured on this underside. The line 80 can be designed as a busbar, for example a grounding busbar, and thus helps to ensure the mechanical stabilization of the cable channel 10.

For releasable securing of the line 80, two securing rows 82 extending equidistantly in the channel longitudinal direction 16 are present on the cable housing 14, more precisely in the region of the outer side 56 of the receiving shell 22. Each securing row 82 has a plurality of securing elements 84 which are mutually spaced in the channel longitudinal direction 16. They are designed for example in the manner of latching webs, which can be resiliently flexible in the transverse direction 20.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense.

Rather, there are several variations and modifications which may be made without departing from the scope of the appended claims.

What is claimed is:

1. A cable channel for receiving at least one cable, comprising:
   a first cable housing including a first connector; and
   a second cable housing including a first mating connector releasably connected to the first connector arranging the first and second cable housings together;
   wherein the first connector includes a connection arm and the first mating connector includes a connection pin, and the first cable housing and the second cable housing are arranged together transversely to a channel longitudinal direction.

2. The cable channel of claim 1, wherein the first cable housing includes a second mating connector and the second cable housing includes a second connector.

3. The cable channel of claim 2, further comprising:
   a terminating part including a plurality of flanking webs spaced apart in a circumferential direction and extending in the channel longitudinal direction, the terminating part releasably connected to one of the second mating connector and the second connector.

4. The cable channel of claim 3, wherein the terminating part includes a flanking ring extending in the circumferential direction and arranged partially inside and partially outside the flanking webs.

5. The cable channel of claim 1, wherein the releasable connection is maintained as a result of a spring force acting between the first and second cable housings transversely to the channel longitudinal direction.

6. The cable channel of claim 5, wherein the spring force is generated by a plurality of spring blocks arranged on an outer side at least one of the first cable housing and the second cable housing.

7. The cable channel of claim 1, wherein the first cable housing includes a receiving shell and a cover shell releasably connected to each another and forming a channel-like cavity for the at least one cable.

8. The cable channel of claim 7, wherein the receiving shell forms at least a portion of the channel-like cavity and the cover shell forms a planar outer surface.

9. The cable channel of claim 1, wherein an outer region of the first cable housing includes a plurality of securing elements mutually spaced in the channel longitudinal direction for releasably securing a line.

10. The cable channel of claim 9, wherein the plurality of securing elements is arranged in a plurality of rows.

11. The cable channel of claim 9, wherein the line is in the form of a busbar.

12. A cable channel for receiving at least one cable, comprising:
    a first cable housing including a first connector at a first end, a first mating connector at a second end, a first connection arm at a first side, and a first connection pin at a second side; and
    a second cable housing including a second connector at a first end, a second mating connector at a second end, a second connection arm at a first side, and a second connection pin at a second side, the first and second cable housings arranged in a channel longitudinal direction having one of the first connector releasably connected to the second mating connector and the second connector releasably connected to the first mating connector; and
    a third cable housing including a third connector at a first end, a third mating connector at a second end, a third connection arm at a first side, and a third connection pin at a second side, the first and third cable housings arranged in a transverse direction having one of the first connection arm releasably connected to the third connection pin and the first connection pin releasably connected to the third connection arm.

13. The cable channel of claim 12, further comprising:
    a terminating part including a plurality of flanking webs spaced apart in a circumferential direction and extending in the channel longitudinal direction, the terminating part releasably connected to one of the second mating connector and the second connector.

14. The cable channel of claim 12, wherein the releasable connection between the first and third cable housings is maintained as a result of a spring force acting between the first and third cable housings transversely to the channel longitudinal direction.

15. The cable channel of claim 12, wherein an outer region of the first cable housing includes a plurality of securing elements mutually spaced in the channel longitudinal direction, and the plurality of securing elements is arranged in a plurality of rows for releasably securing a line.

16. A cable channel for receiving at least one cable, comprising:
    a first cable housing including a first connector and a first mating connector;
    a second cable housing including a second connector and a second mating connector, the second mating connector releasably connected to the first connector arranging the first and second cable housings together; and
    a terminating part including a plurality of flanking webs spaced apart in a circumferential direction and extending in a channel longitudinal direction, the terminating part releasably connected to one of the first mating connector and the second connector.

17. The cable channel of claim 16, wherein the first cable housing and the second cable housing are arranged together in the channel longitudinal direction.

18. The cable channel of claim 16, wherein the terminating part includes a flanking ring extending in the circumferential direction and arranged partially inside and partially outside the flanking webs.

19. The cable channel of claim 16, wherein an outer region of the first cable housing includes a plurality of securing elements mutually spaced in the channel longitudinal direction for releasably securing a line.

20. The cable channel of claim 19, wherein the line is in the form of a busbar.

* * * * *